US008983670B2

(12) United States Patent  
Shetty et al.

(10) Patent No.: US 8,983,670 B2  
(45) Date of Patent: Mar. 17, 2015

(54) ENERGY CONSUMPTION DISAGGREGATION SYSTEM

(75) Inventors: Pradeep Shetty, Bangalore (IN); Wendy Foslien, Woodbury, MN (US); Keith Curtner, St. Paul, MN (US); Purnaprajna R. Mangsuli, Bangalore (IN); Soumitri Kolavennu, Blaine, MN (US)

(73) Assignee: Honeywell International Inc., Morristown, NJ (US)

( * ) Notice: Subject to any disclaimer, the term of this patent is extended or adjusted under 35 U.S.C. 154(b) by 401 days.

(21) Appl. No.: 13/232,398

(22) Filed: Sep. 14, 2011

(65) Prior Publication Data

US 2013/0066479 A1 Mar. 14, 2013

(51) Int. Cl.
*G05B 15/02* (2006.01)
*G05B 13/02* (2006.01)
(Continued)

(52) U.S. Cl.
CPC .............. *G01D 4/002* (2013.01); *Y02B 90/245* (2013.01); *Y02B 90/241* (2013.01); *Y04S 20/32* (2013.01); *Y04S 20/38* (2013.01); *Y04S 20/40* (2013.01)
USPC ............. 700/291; 700/296; 700/298; 702/61; 702/62; 706/54; 324/116

(58) Field of Classification Search
CPC ........ G05B 13/02; G05B 15/02; G06Q 30/02; G06Q 50/06; G06Q 10/06; Y04S 20/221; Y04S 20/222; Y04S 20/38; Y02B 70/3216; Y02B 70/3225; G01R 19/2513; G06F 1/26; G06F 11/3062; H02J 1/14; H02J 3/14
USPC ........ 700/291, 295, 296–298; 702/60, 61–62; 706/54; 324/116
See application file for complete search history.

(56) References Cited

U.S. PATENT DOCUMENTS 4,465,970 A * 8/1984 DiMassimo et al. .......... 324/116  
4,858,141 A 8/1989 Hart et al.  
(Continued)

FOREIGN PATENT DOCUMENTS

EP 2290328 3/2011  
WO WO 2012052868 4/2012

OTHER PUBLICATIONS

Hart, "Nonintrusive Appliance Load Monitoring," IEEE, vol. 80 No. 12, p. 1870-1891, Dec. 1, 1992. ISSN: 0018-9219.

(Continued)

*Primary Examiner* — Crystal J Barnes-Bullock  
(74) *Attorney, Agent, or Firm* — Seager Tufte & Wickhem LLC.

(57) ABSTRACT

A system for disaggregating a gross energy measurement into individual component energy consumption. A collection of components may be situated in a facility. A sensor may obtain electrical signals from one or more power input lines which convey power to the facility for the components. The signals may indicate the total energy consumption by the collection of components. Approaches and/or mechanisms may be used to disaggregate the indication of total energy consumption into indications of individual energy consumption by the components without the need for separately determining the individual energy consumption with additional measurements or instrumentation. Also, approaches and/or mechanisms may be used for integrating a known load activity with whole facility energy consumption for enhancing the component disaggregation. Indications of individual energy consumption permit a reasonable evaluation of components from efficiency, conservation and/or other perspectives.

13 Claims, 16 Drawing Sheets

(51) Int. Cl.
  *G06Q 50/06* (2012.01)
  *G06F 1/26* (2006.01)
  *G01R 21/06* (2006.01)
  *G06N 7/00* (2006.01)
  *G01D 4/00* (2006.01)

(56) References Cited

U.S. PATENT DOCUMENTS

| | | | |
|---|---|---|---|
| 5,483,153 A | 1/1996 | Leeb et al. | |
| 5,566,084 A | 10/1996 | Cmar | |
| 6,122,603 A | 9/2000 | Budike, Jr. | |
| 6,311,105 B1 | 10/2001 | Budike, Jr. | |
| 6,553,418 B1 | 4/2003 | Collins et al. | |
| 6,925,369 B2 * | 8/2005 | Obayashi et al. | 701/36 |
| 6,937,946 B1 | 8/2005 | Culp et al. | |
| 7,693,670 B2 * | 4/2010 | Durling et al. | 702/62 |
| 8,412,491 B2 | 4/2013 | Souilmi | 702/188 |
| 8,560,134 B1 * | 10/2013 | Lee | 700/291 |
| 8,660,813 B2 * | 2/2014 | Curtis et al. | 702/130 |
| 8,812,427 B2 * | 8/2014 | Kim et al. | 706/52 |
| 2010/0305889 A1 * | 12/2010 | Tomlinson et al. | 702/62 |
| 2011/0184574 A1 * | 7/2011 | Le Roux et al. | 700/291 |
| 2012/0072389 A1 * | 3/2012 | Aldridge et al. | 706/54 |
| 2012/0143536 A1 * | 6/2012 | Greaves et al. | 702/60 |
| 2012/0197560 A1 * | 8/2012 | Kuhns et al. | 702/60 |
| 2012/0290230 A1 * | 11/2012 | Berges Gonzalez et al. | 702/61 |
| 2012/0296512 A1 * | 11/2012 | Lee et al. | 701/29.3 |
| 2013/0030600 A1 | 1/2013 | Shetty et al. | |
| 2013/0030732 A1 | 1/2013 | Shetty et al. | |
| 2013/0066476 A1 * | 3/2013 | Tyagi et al. | 700/291 |
| 2013/0110621 A1 * | 5/2013 | Gupta et al. | 705/14.52 |
| 2013/0158911 A1 * | 6/2013 | Young et al. | 702/62 |
| 2013/0215933 A1 * | 8/2013 | Young et al. | 375/145 |
| 2014/0149056 A1 * | 5/2014 | Lelkens et al. | 702/61 |

OTHER PUBLICATIONS

European Search Report for Corresponding No. EP 12184119, dated Dec. 20, 2012.

* cited by examiner

US 8,983,670 B2

ENERGY CONSUMPTION DISAGGREGATION SYSTEM

BACKGROUND

The present disclosure pertains to energy and particularly to energy consumption. More particularly, the disclosure pertains to measurement of energy consumption.

SUMMARY

The disclosure reveals a system for disaggregating an indication of total energy consumption for a collection of components into indications of individual energy consumption for each of the components, respectively. The collection of components may be situated in a facility. A sensor may obtain electrical signals from one or more power input lines which convey power to the facility for the components. The signals may indicate the total energy consumption by the collection of components. There may be approaches and/or mechanisms which are used to disaggregate the indication of total energy consumption into indications of individual energy consumption by the components without the need for separately determining the individual energy consumption with additional measurements or instrumentation. Also, approaches and/or mechanisms may be used for integrating a known load activity with whole facility energy consumption for enhancing the component disaggregation. Indications of individual energy consumption may permit evaluation of components from efficiency, conservation and/or other perspectives, in a reasonable manner.

DESCRIPTION

Figure 1:
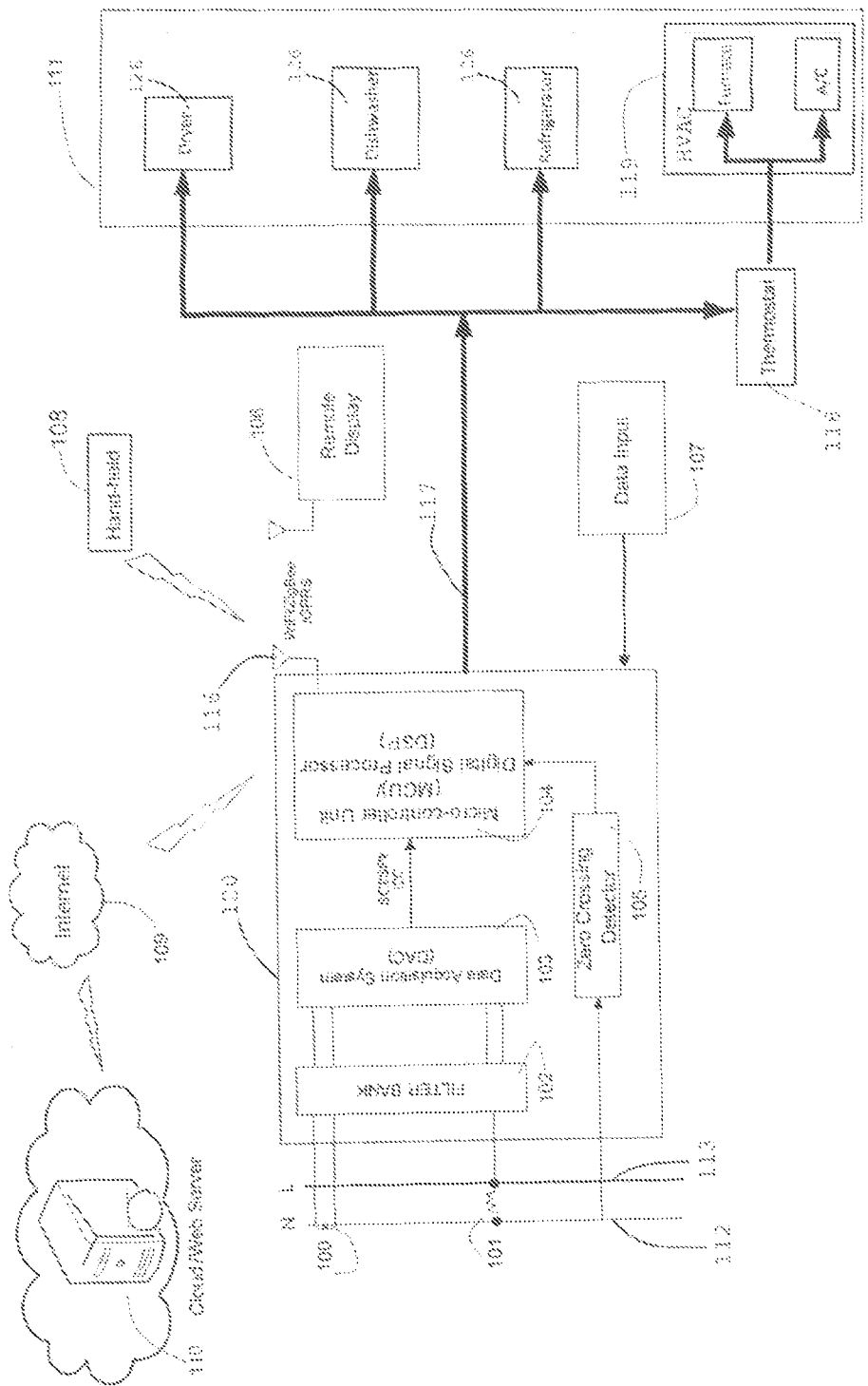
FIG. 1 is a diagram showing major components of a load disaggregation system for such places as a home or building.

A system and approach for load disaggregation (e.g., separation into components) may be noted. An ever increasing interest in energy-efficient buildings may be driving research and development in the field of building design, energy conservation, energy harvesting, renewables, and so on. Energy conservation may be one of the important areas for which, focusing on the electricity consumption from the individual appliances is very useful. This may motivate and guide a user in conservation effort, and also act as a verification tool. Seeing electricity usage in near real time, throughout the day, may make it easier to reduce the consumption and save money. Moreover, automated systems for energy management may use the near real-time energy consumption readings and their changes with respect to an adopted control action to confirm the efficacy and/or further refine the automatic control action for energy management.

Energy awareness concepts among residential and commercial users may be an approach to provide information on the energy usage and thus providing value by preventing the energy wastage. Disaggregation by end-use may be very useful in understanding the scenario and aid both consumers and producers to identify targets for conservation. While hardware-based sub-metering appears costly and labor-intensive, non-intrusive load monitoring (NILM) may be capable of gathering detailed energy-use data with minimal equipment cost and installation time. Installation of energy measurement equipment for each appliance appears to incur extra costs. Besides, additional functionalities like communication may be added to ensure that the energy measurement values are communicated to a central module where the energy awareness can be calculated and displayed. This all may indicate additional cost. Assuming a cost of $50 (US) for each piece of energy measurement equipment, it may easily work out to be an extra $250 in case, for instance, five appliances have to be measured.

The granular energy consumption details for equipment may be critical for demand side management. This approach may provide a way to infer appliance level energy usage without the need for granular energy measurement which would require additional energy measurement devices. However, variations in measurements between metering devices may complicate the process of compiling the necessary appliance profiles. Granular energy details for individual equipments may be useful in developing intelligent algorithms to manage energy consumption. The present approach may estimate the energy consumed by individual appliances, based on a gross energy meter reading.

The present approach does not necessarily involve adding any energy measurement module per piece of equipment. A single digital meter may be installed at the incoming line within the residence/commercial facility. The meter may be fixed after a tariff meter or be the tariff meter itself. This meter may store readings of the total energy consumed at a required level of granularity. The user may provide appliance details and usage hours on a typical day including weekends and holidays. The appliance details may include the rating of the load and type of the load like, for example, a washing machine, hot water circuit, AC, and so on. The system may also learn the actual consumption by monitoring the energy usage on a continuous basis. The system may infer the individual appliance usage with the help of energy measurement and the appliance specifications.

The components of the system may incorporate: 1) An energy measurement device for gross energy measurement; 2) A central node which performs granular measurement; and 3) The energy measurement device which transmits gross energy data to the central node on a periodic basis. The central node may run an algorithm required to break up the gross measurement into individual measurements of load consumption of appliances.

Hardware-based sub-metering appears costly and labor-intensive. Non-intrusive load monitoring (NILM) may be capable of gathering detailed energy-use data with minimal equipment cost and installation time. The granular energy consumption details for equipment may be critical for demand side management. This approach may provide a way to infer appliance level energy usage without the need for granular energy measurement which would require additional energy measurement devices. However, variations in measurements between metering devices may complicate the process of compiling the necessary appliance profiles. Granular energy details for individual pieces of equipment may be useful in developing intelligent algorithms to manage energy consumption The accuracy of the energy inference may be questionable in such kind of a system. Thus, one may provide a new architecture and algorithm for the load disaggregation.

The salient features of the system may incorporate: 1) Load switching event detection based on instantaneous voltage and current signatures and derived parameters such as instantaneous harmonics, peak current, voltage dip, current and voltage symmetrical component analysis considering whole house energy and residual load energy parameters; 2) Load disaggregation based on time domain, frequency domain and time-frequency domain analysis; 3) An intelligent decision support system; and 4) A hardware platform which can acquire data from a heating, ventilation and air conditioning (HVAC) system and smart appliances for disaggregation purposes.

A system and approach for load disaggregation may be noted. A diagram of FIG. 1 may represent the major components of the load disaggregation system for a facility, such as a home or building. The electrical supply may be a two-phase three-wire system with a 60 Hz frequency and a phase voltage of 120 V. In another approach, the supply may be a three-phase, four-wire system with a 50 Hz electric distribution system with a phase voltage of 230V. In still another approach, the electric power supply system may be single-phase 60 Hz system with a phase voltage of 120V. In yet another approach, the power supply may be a single-phase, 50 Hz and 230V power supply. Other electrical services may be utilized.

FIG. 1 is a diagram of hardware architecture for a load disaggregation system 120. Power may be provided by lines 112 and 113 to system 120. A current sensor 100 and voltage sensor 101 may provide current and voltage indications to a filter bank 102 of system 120. Outputs from filter bank 102 may go to a data acquisition system (DAC) 103. Information from data acquisition system 103 may go to a micro controller unit (MCU) 104 and/or digital signal processor (DSP) 104 via a serial communication, serial peripheral and communication interfaces. The micro controller may incorporate the digital signal processor. A zero crossing detector 105 may provide voltage and current zero crossing information to MCU and/or DSP 104. Information may be provided by a data input module 107 to system 120. A cloud/web server 110 may be connected to system 120 via an internet connection 109. A handheld personal digital assistant (PDA) 108 may be connected to system 120 via a wireless connection to an antenna 116 connected to MCU and/or DSP 104, which may be capable of WiFi, ZigBee, GPRS, and the like. A remote display 106 may have a wireless connection to system 120. An output 117 may provide disaggregated information from measurements of power lines 112 and 113 about a facility 111. The information on output 117 may indicate power-using components such as a dryer, dishwasher, refrigerator, HVAC, and so forth, at facility 111. Also, information may provide information about an associated thermostat 118, such as settings for an HVAC 119 at facility 111.

A sensing unit 100 and 101 may provide the required input range to a data acquisition system 103. Current sensor coils 100 (or current transformer) may be installed in each supply line, which step down the total current drawn (or total load) into a range suitable for measurement using a data acquisition system 103. The current and voltage sensor network 100 and 101, respectively, may typically be located at the main electric service panel at a home or building (i.e., facility 111) and the wiring may be provided for various appliances and equipment thereafter through regular or miniature circuit breakers (MCBs). The present approach may be adapted for using other power sensing devices such as energy meters, smart AMI (advance metering infrastructure) meters, and so forth.

DAC 103 may be designed to sample the analog voltage and current signals received from the voltage and current sensor network 100 and 101 at a desired sampling frequency. The sampling frequency may be adjusted to optimize the processing capability of the computing units downstream. In one approach, the DAC system 103 may acquire the voltage (V) and current (I) samples at a pre-decided frequency, and the pre-processing system 201 (FIG. 4) may process the raw data and modify the sampling rate as required by the main processing unit 104. In one approach, the DAC system 103 may acquire an instantaneous voltage and instantaneous current at a desired sampling rate. The approach may be adapted to work with other versions of data acquisition.

Figure 2:
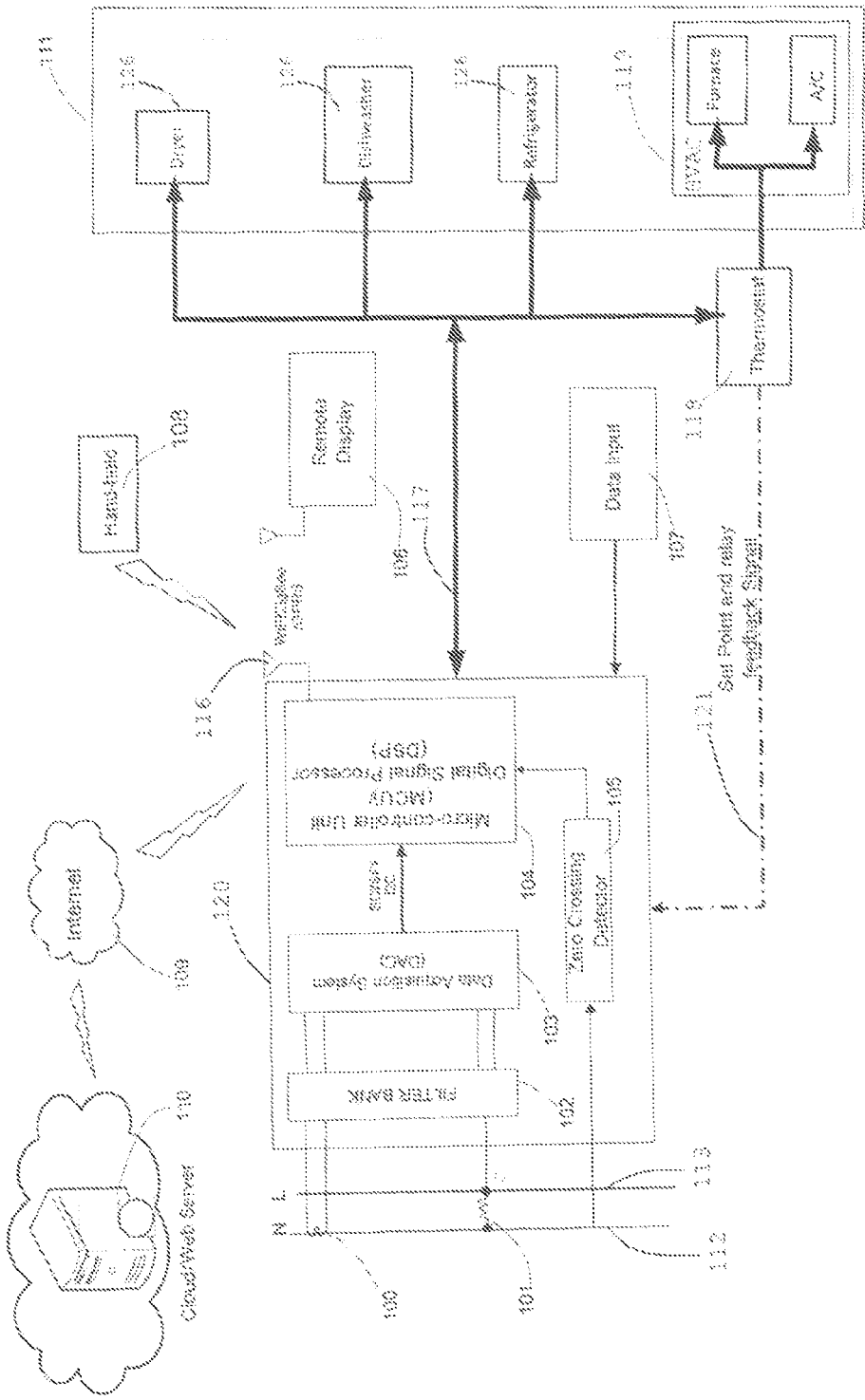
FIG. 2 is a diagram of hardware architecture for a load disaggregation system which is similar to the system in FIG. 1, except that the system shown in FIG. 2 has a thermostat state feedback and an output which may also be an input for some components of a facility.

FIG. 2 is a diagram of hardware architecture for load disaggregation system 120, which is similar to the system in FIG. 1, except that the system of FIG. 2 has a thermostat state feedback 121. Also, output 117 in FIG. 1 is also an input from thermostat 118, HVAC 119 and appliances of facility 111 in FIG. 2. In the configuration of FIG. 2, system 120 may take inputs from HVAC set points, relay signals and power consumption for improving the accuracy of load disaggregation.

Figure 3:
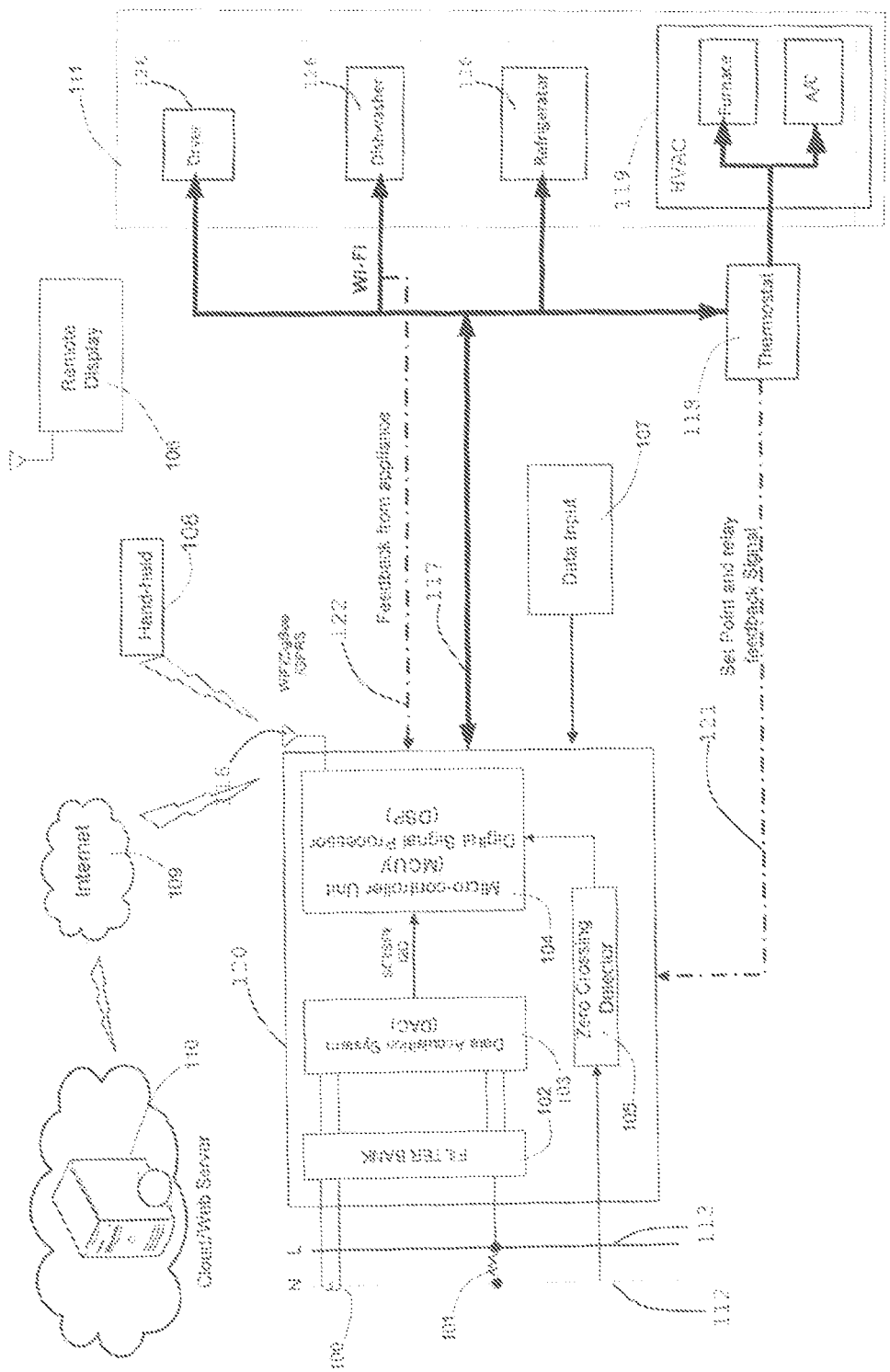
FIG. 3 is a diagram of hardware architecture for a load disaggregation system similar to the system of FIG. 2 but with a smart appliance state feedback.

FIG. 3 is a diagram of hardware architecture for a load disaggregation system similar to the system of FIG. 1 but with thermostat setpoint and relay feedback signal 121, an input 117 from thermostat 118, HVAC 119 and appliances of facility 111, and a smart appliance state and energy consumption feedback signal 122. The system of FIG. 3 may receive inputs from one or more smart appliances, in addition to HVAC setpoints, relay signals, and power consumption for aid in disaggregation of the power used or being used.

The preprocessing block 201 (FIG. 4) may transform the digital voltage and current samples into a form as desired by the algorithms which process the transformed data. In one of the approaches, the preprocessing block 201 may down sample the acquired current and voltage data and provide a data at a rate as requested by the main processing unit 104 (FIGS. 1-2).

In another approach, a power parameter calculation module of a preprocessing block 201 (FIG. 4) may deduce the secondary power/energy parameters, such as, active power, reactive power, apparent power, electrical energy (KWh), line frequency, harmonic content, peak power, instantaneous power, symmetric components, instantaneous harmonics and so forth. The approach may be adapted for other versions of pre-processing, deducing other parameters.

Figure 4:
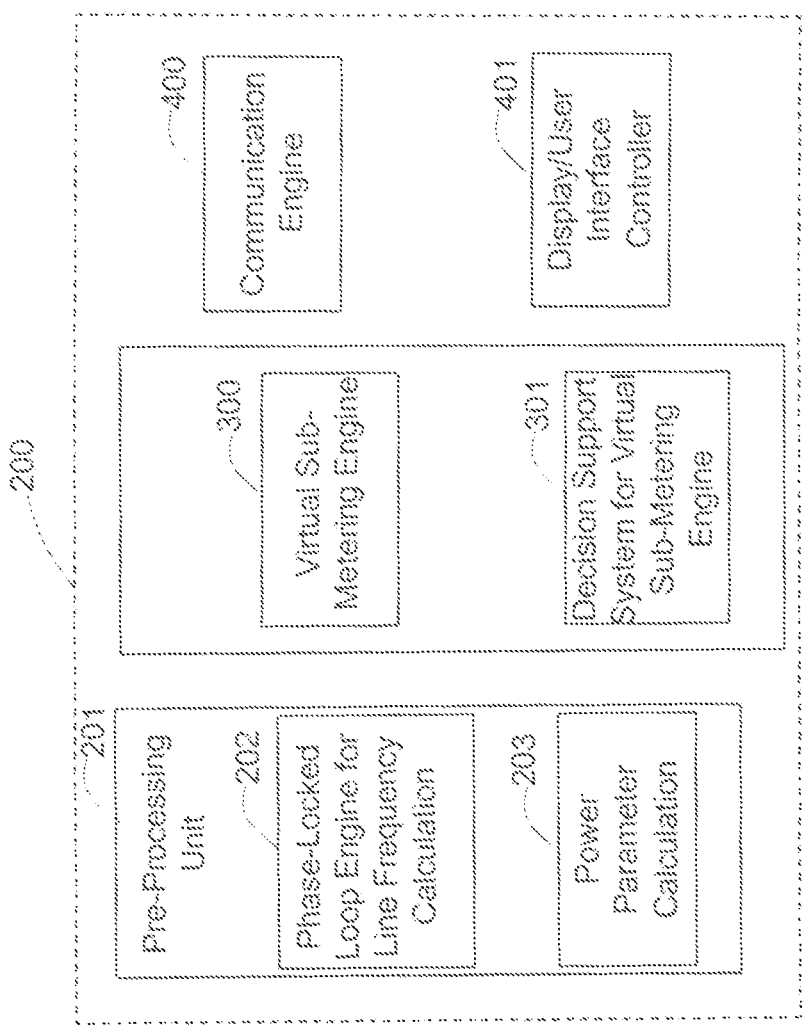
FIG. 4 is a diagram a processor and functionalities for achieving load disaggregation.

FIG. 4 is a diagram of a processor 200 and various functionalities for achieving load disaggregation. In one approach, the main processor block 104, 200 (FIGS. 1-4) may consist of a virtual sub-metering (VSM) engine 300 and a decision support system (DSS) 301 for the VSM engine. Also, in another approach, the load disaggregation may be segregated into several steps, namely, load switching detection, a VSM engine analysis 300, and decision support system 301. The one or more approaches may be adapted to many other versions for performing the load disaggregation task.

Specifically, processor 200 may have a preprocessing unit 201 with a phase-locked loop (PLL) engine 202 for line frequency calculation and a power/energy parameter calculation mechanism 203. Another portion of processor 200 may incorporate a VSM engine 300 and a DSS 301 for the VSM. Also a part of processor may incorporate a communication engine 400 and a display/user interface controller 401.

In one or more approaches, the instantaneous phase current, instantaneous current harmonics, current symmetrical components and phase voltage may be analyzed to detect an appliance/equipment switching event. A detailed analysis of the load signature may be carried out in case of detection of a switching event. Many different detection approaches may be available for this purpose. In one approach, a hypothesis testing technique in combination with maximum likelihood detection may be carried out. Other parallel techniques in the field of data analysis may be incorporated in the one or more present approaches.

After detecting the switching event, the VSM engine may compare the state of HVAC and smart appliances and deduct the power drawn by HVAC and smart appliances from whole house appliances. This may reduce the uncertainty of load disaggregation. The remaining energy information also known as residual load may be analyzed further for load disaggregation.

The VSM engine may carry out the time-frequency analysis of the load signature or the residual load signature to assign the state of individual home appliance/equipment. In one approach, a wavelet based signal transformation approach may be used, wherein the data in time-domain are transformed to a time frequency domain. A continuous or a discrete wavelet transform may be contemplated based on the processing capability of the main processor 104. In one of the approaches, the system may derive the instantaneous harmonics as discrimination features for detecting the type of load. Many other parallel time domain, frequency domain or time-frequency domain techniques may be contemplated in the present approaches.

A series of transformation coefficients (also known as features) may be extracted from the transformed variables. In one approach, a set of wavelet coefficients across the scales may be selected based on thresholding techniques. Hard or soft thresholding may be used for this purpose and various techniques for fixing the threshold under various levels may be contemplated. A signature analysis on the selected coefficients may be performed to reveal further details on the activities at a home. In another approach, the system may use un-decimated wavelet transforms (UDWT) to detect and classify the load status.

The system may be sufficiently intelligent to estimate the type of loads connected to the house and their power ratings. For this purpose, the system may acquire a set of historical data and analyze the load switching patterns to deduce the different loads connected to the house. In one approach, the system may consider the current difference (or change in current) and active power difference (or change in active power), and then perform the data clustering techniques to understand different loads connected to the system. Then the detected loads may be pruned using load occurrence probability and load magnitude variation. This intelligence in the system may make it versatile for use in any home or building with minimal load information. The outcome of an analysis may be displayed in the energy manager for user review. These load parameters may then be taken ahead as configuration parameters for load disaggregation.

A decision support system may perform a second level of the check on power parameters to minimize false alarms. In one of the approaches, a fuzzy decision support system may be employed. In the field of data analysis, many other parallel decision support systems may be contemplated for the present purpose.

Figure 5A:
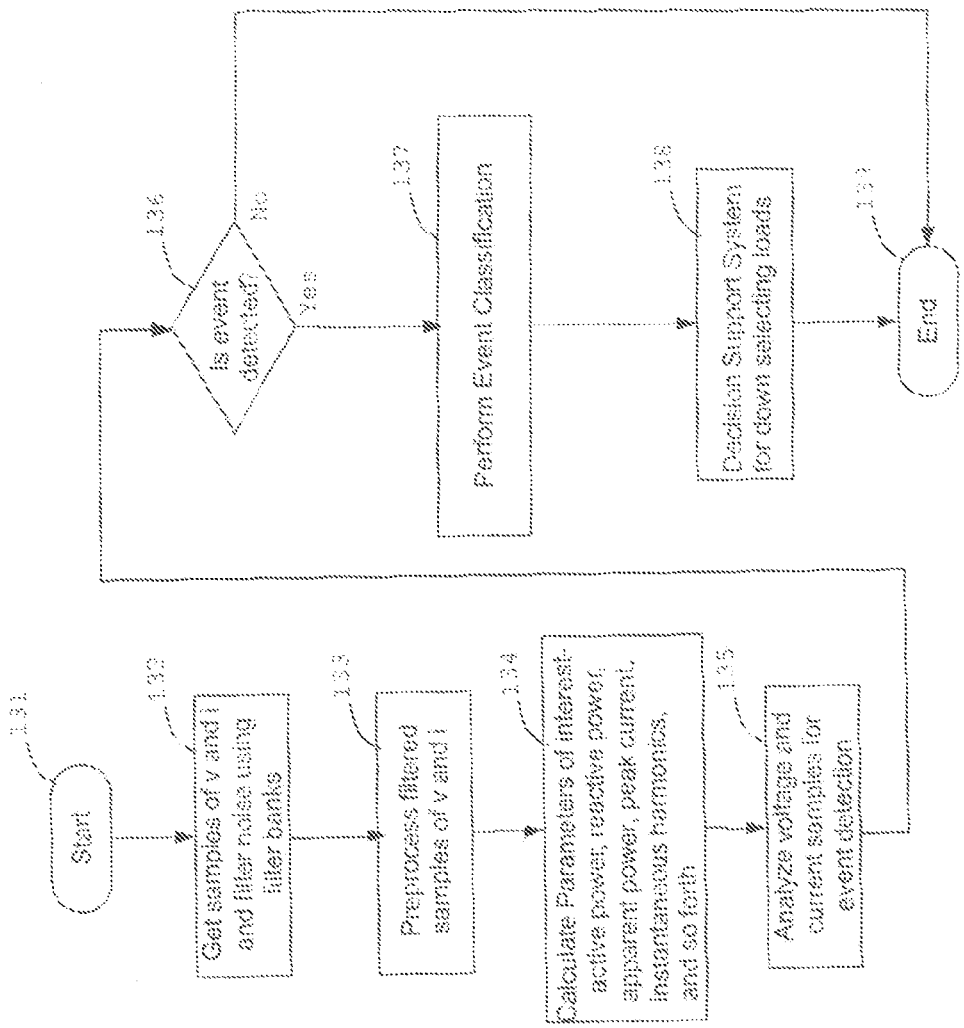
FIG. 5a is a flow diagram of a load disaggregation process.

FIG. 5a is a flow diagram of a load disaggregation process. The process may begin at symbol 131 and go to symbol 132 where samples of V and I are obtained and noise is filtered using filter banks. Filtered samples of V and I may be preprocessed at symbol 133. Parameters of interest, such as active power, reactive power, apparent power, peak current, instantaneous harmonics, and so forth, may be calculated at symbol 134. At symbol 135, the voltage and current samples may be analyzed for event detection. A question whether an event is detected may be asked at symbol 136. If the answer is no, the process may end at symbol 139. If the answer is yes, then event classification may be performed at symbol 137. The results of the classification at symbol 137 may go to a decision support system for down selecting loads at symbol 138. From symbol 138, the process may end at symbol 139.

Figure 5B:
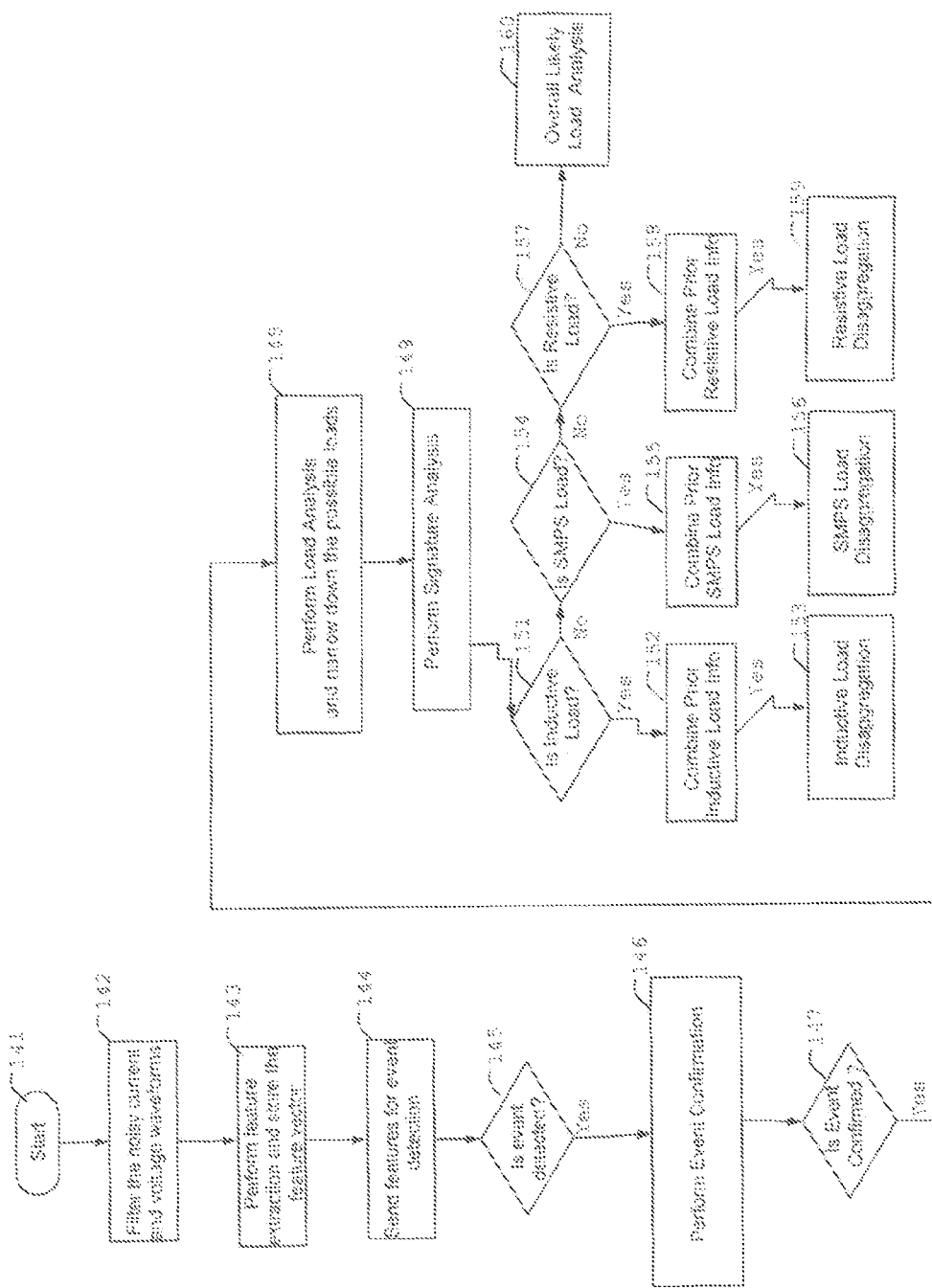
FIG. 5b is a diagram of another load disaggregation process.

FIG. 5b is another diagram of a load disaggregation process. The process may begin at symbol 141 and go to symbol 142 where noisy current and voltage waveforms are filtered. At symbol 143, feature extraction may be performed and feature vectors may be stored. The features may be sent for detection at symbol 144. A question is asked at symbol 145 whether an event is detected. If the answer is yes, then event confirmation may be performed at symbol 146. Event confirmation is required to avoid spurious event detection due to sensing noise or noise introduced from the power line. A question is asked at symbol 147 whether the event is confirmed. If yes, then at symbol 148 load analysis is performed and the possible loads are narrowed down. Signature analysis may be performed at symbol 149. A question at symbol 151 is whether the load is inductive. If yes, then the prior load inductive information is combined at symbol 152. At symbol 153, inductive load disaggregation may be performed. If the answer to the question is no at symbol 151, then a question at symbol 154 whether the load is an SMPS (switched-mode power supply) may be asked. If yes, then the prior SMPS load information may be combined at symbol 155. At symbol 156, SMPS load disaggregation may be performed. If the answer to the question is no at symbol 154, then a question at 157 whether the load is resistive may be asked. If yes, then the prior resistive load information may be combined. At symbol 159, resistive load disaggregation may be performed. If the answer to the question is no at symbol 157, then an overall likely load analysis may be performed at symbol 160.

Figure 5C:
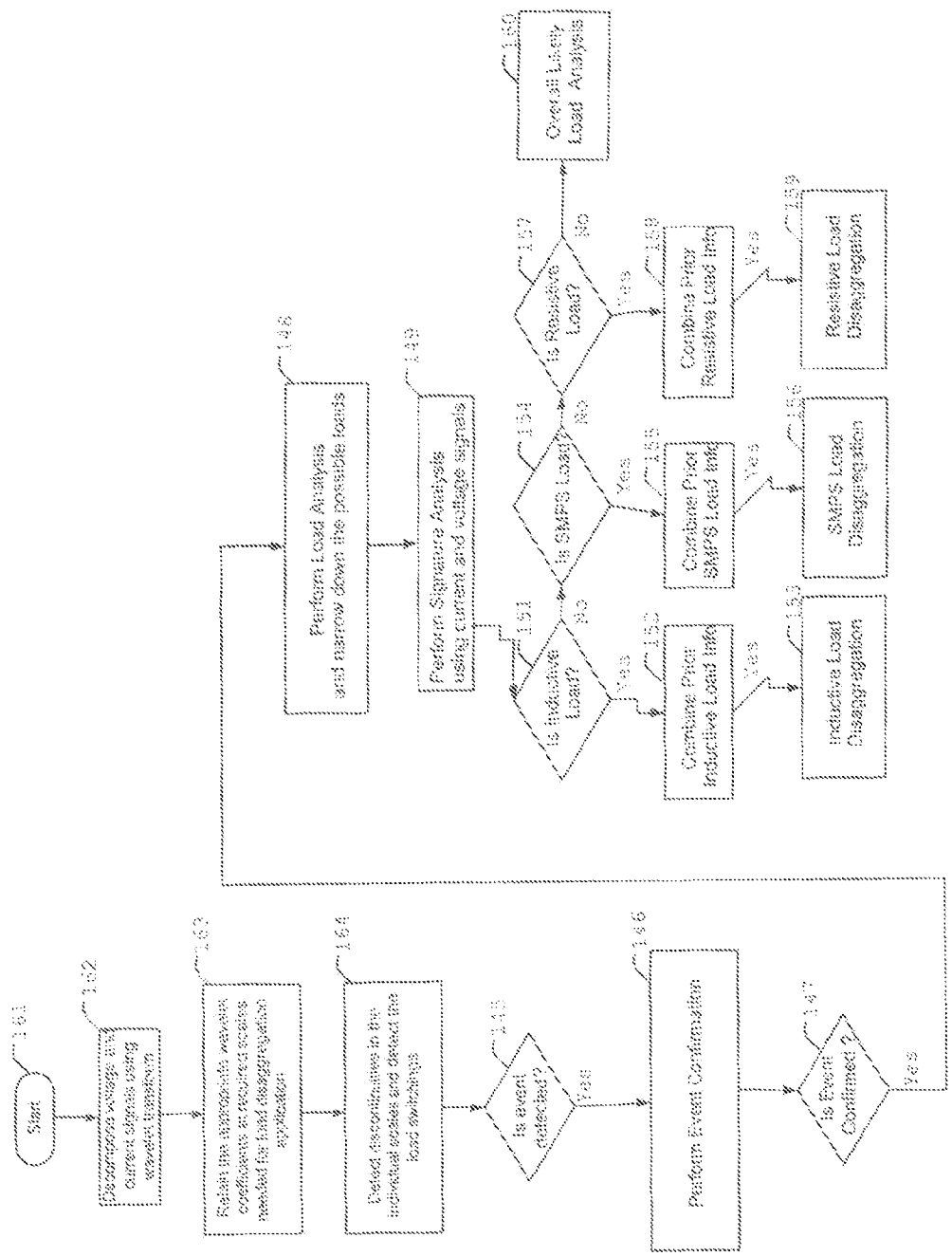
FIG. 5c is a diagram of still another load disaggregation process.

FIG. 5c is still another diagram of a load disaggregation process. The process may begin at symbol 161 and go to symbol 162 where voltage and current signals are decomposed using a wavelet transform. At symbol 163, the appropriate wavelet coefficients may be retained at the required scales for load disaggregation application. Discontinuities in the individual scales may be detected and load switchings may be detected at symbol 164. At symbol 165, the question whether an event is detected might be asked in the same manner as at symbol 145 in FIG. 5b. Also, the remaining portion of the process is similar to that in FIG. 5b. It may be particularly noted that signature analysis may be performed using current and voltage signals as indicated at symbol 149.

One may note that box or symbol 146 of FIGS. 5b and 5c may state "Perform Event Confirmation". A box or symbol 137 in FIG. 5a may state "Perform Event Classification". Symbols 146 and 137 appear different. One may note that FIG. 5a is a generic block diagram and FIG. 5b shows a step for time domain analysis. The event confirmation in symbol 146 FIG. 5b may be exclusively meant for a time domain analysis step, where spurious noise in energy signals may trigger events. However, event confirmation steps may make sure that the event trigger was not due to spurious noise but due to actual load switching.

FIGS. 5b and 5c show several different approaches relative to load disaggregation. FIG. 5b reveals time domain analysis where energy signature (voltage and current) may be analyzed for event detection. This may be shown particularly in symbols 141 to 145. On the other hand, FIG. 5c reveals time-frequency based approach which may be known as wavelet transform techniques used to detect the event and load disaggregation. This approach may be described in symbols 161 to 165. Once an event is detected, the rest of disaggregation process may remain the same. Thus, there may be similar symbols in both Figures after an initial event detection mechanism.

There may be process steps between, for example, blocks or symbols 152 and 153, and steps for load disaggregation in symbol 153. A process step may be a combining the current load signature/wavelet feature information and prior information. There may be several ways of combing, namely, a fuzzy logic based approach, Bayesian approach or Dempsher-Shepherd information fusion approach. However, one may keep the approach generic.

One may note where the "prior SMPS load info", for instance, comes from in symbol 155. The prior information on each type may be obtained after mining historical data. For example, in a particular house, the water heater may likely be switched on in the mornings. Other information may be that a pool pump operates only during noon, when the electricity price is low. One may deduce this information from the historical load data of the house, which can be called "prior info". In the present particular approach, one may first classify the loads based on their electrical characteristics (resistive, inductive, SMPS, and so forth) and then combine (or make use of "prior info") to disaggregate the load. In short, the prior SMPS load info may come from an analysis of historical data.

One may note the process and/or end result of the "overall likely load analysis" in symbol 160. When signature analysis is performed, there may be a situation where the analysis engine fails to recognize the load. These may be regarded as "miscellaneous loads". One may take this as miscellaneous loads and stop the analysis. Or, one may further analyze the miscellaneous load and provide additional information regarding the likely load (with an associated confidence number). This may be covered in "Overall Likely Load Analysis" 160. One might replace "overall load" with "miscellaneous load".

A system and approach for residential, commercial and industrial base load analyses may be noted. A base load may be a range of minimum electrical loads over a given period of time present in a home, industry or a commercial building. A high base load may indicate a potential energy inefficiency of a building. An analysis of the base load may provide ways to improve the energy performance of a building such as a house. In particular, base load analysis may identify persistent loads which may result in ways to reduce elements of consumption, such as continuously operating fans, low level HVAC loads, or various plug loads.

Because of the continuous nature of a base load, a total energy consumption of a residence/building/industrial complex may be significantly reduced by decreasing the base load. This may help in reducing the energy footprint of the building and improving savings in electricity bills.

In an approach, a main processor block may host a suite of base load analysis algorithms. The analysis may be segregated into two steps, namely, anomaly detection and base load analysis. An anomaly detection module may analyze the total active and reactive power drawn by a load. This load may be compared with a reference value which is adaptively obtained from a pre-calculated list/table/function as per standards. This reference value may be a function of many attributes, such as location, time of day, ambient conditions, number of occupants, and so on. The comparison may provide the performance of the home with the values as stipulated in the standards. In another approach, the system may perform a time-based load analysis using acquired data and compare the results with historical data. In this way, the system may provide a chronological comparison of the base load, which could help in detecting an anomaly.

In one approach, instantaneous phase current and phase voltage may be analyzed to detect an appliance/equipment switching event. A detailed analysis of the load signature may be carried out in case of detection of a switching event. Many different detection techniques may be available for this purpose. In one approach, a hypothesis testing technique in combination with maximum likelihood detection may be carried out. After detecting the event, the type of load may be inferred from the available list of loads present in the facility. This load may then be analyzed and further action may be contemplated to reduce the base load consumption.

In another approach, a set of parameters such as peak current, RMS current, rate of change of current, frequency change may be estimated and compared with reference thresholds. Under an anomaly, the event may be analyzed for determining whether the event is of interest or not. In one approach, the algorithm may compare the parameters of interest to stored parameters in the memory. The system may estimate the signature and understand whether a 24×7 appliance/equipment is switched ON or an occupant turned on the system. In case of detection of an event of interest, the base load analysis system may further process the data and investigate the anomaly. In one approach, the system may estimate a spectrum of the instantaneous current signal and analyze the frequency components. In still yet another approach, the base load system may use a short-time-Fourier transform-based spectrum estimation and a non-parametric technique in the other one. In yet another approach, the signal processor may use an adaptive filtering algorithm to estimate the base load. In another approach, the signal processor may use a Kalman filter for the purpose. In yet another approach, the signal processor may use a wavelet-based time-frequency estimation technique.

An overall idea in the present analysis may be to obtain a state of the appliances/equipment and other loads and then to perform a base load analysis. The detailed analysis may bring out the reasons for higher base load and provide a way to control the loads. An active feedback on energy performance and recommended actions may be provided to the user. Another kind of technique in this regard may be adapted.

A system and approach for residential, commercial and industrial base load analyses may be noted. A base load may be a minimum electrical load over a given period of time present in a home, industry or a commercial building. A high base load may indicate an energy inefficiency of a building. An analysis of the base load may reveal various loopholes in the thermal design of a house or building, unnecessary loads, and provide ways to improve the energy performance of the house or building.

Figure 6:
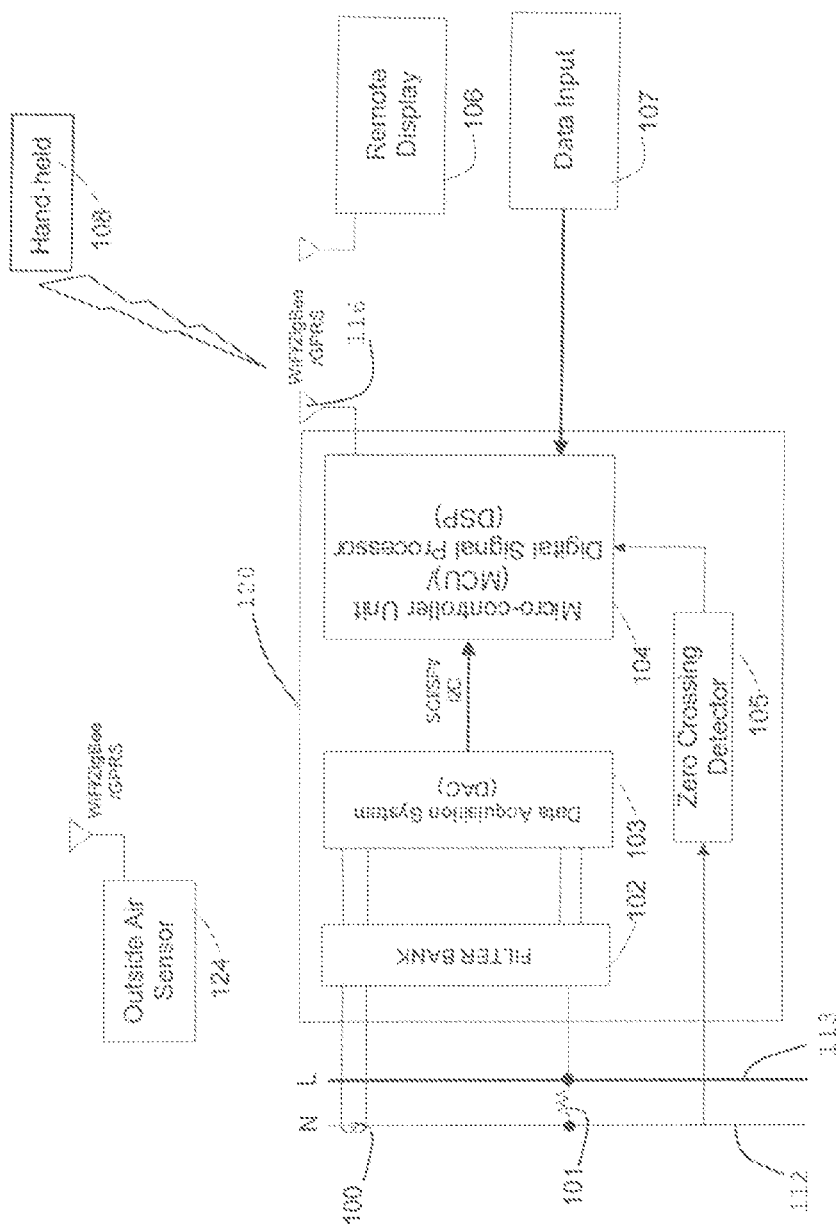
FIG. 6 is a diagram of architecture for a base load analysis in a residential scenario.
Figure 7:
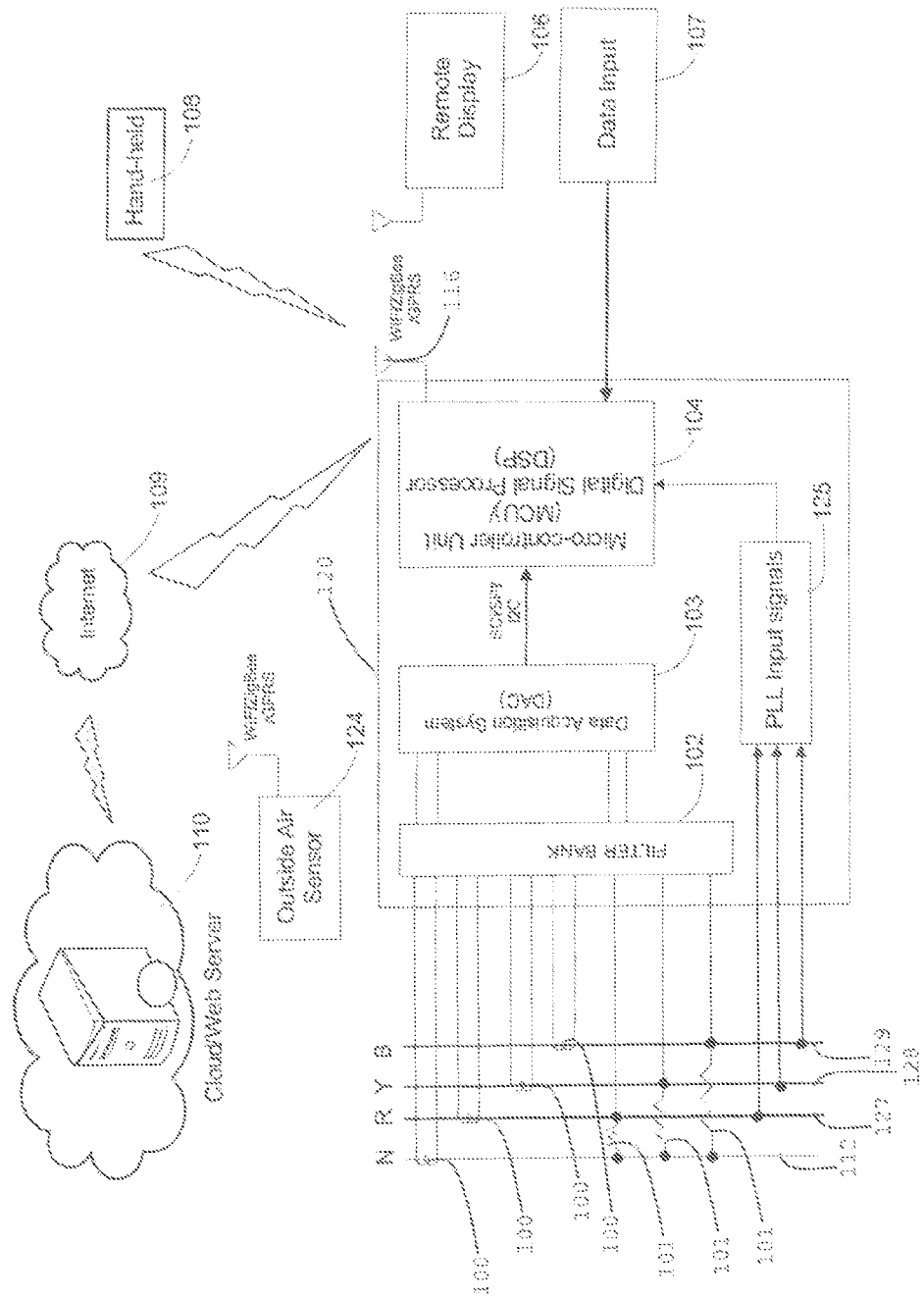
FIG. 7 is a diagram of architecture for base load analysis in an industrial scenario.

FIG. 6 and FIG. 7 are diagrams of major components of the system. The electrical supply may be a two-phase three-wire system with a 60 Hz frequency and a phase voltage of 120V. In another approach, the electrical supply may be a three-phase, four-wire, 50 Hz electric distribution system with a phase voltage of 230V. In another approach, the electric power supply system may be a single-phase 60 Hz system with a phase voltage of 120V. In yet another approach, the power supply may be a single-phase, 50 Hz, 230V supply. The approach may be adapted for other kinds of electrical services.

FIG. 6 is a diagram of hardware architecture for base load analysis in a residential scenario. The diagram is of hardware architecture for a load disaggregation system 120. Power may be provided by lines 112 and 113 to system 120. A current detector 100 and voltage sensor 101 may provide current and voltage indications to a filter bank 102 of system 120. Outputs from filter bank 102 may go to a DAC 103. Information from DAC 103 may go to an MCU and/or DSP 104 via a serial and other communication, serial peripheral and communication interfaces. A zero crossing detector 105 may provide zero crossing information about the power from lines 112 and 113 to MCU and/or DSP 104 to calculate line frequency and phase information. Information may be provided by a data input module 107 to system 120. A hand-held PDA 108 may be connected to system 120 via a wireless connection to an antenna 116 connected to MCU and/or DSP 104, which may be capable of WiFi, ZigBee, GPRS, and the like. A remote display 106 may have a wireless connection to system 120. An outside sensor 108 may provide information in a form of wireless signals to system 120 via antenna 116.

FIG. 7 is a diagram of hardware architecture for base load analysis in an industrial scenario. This diagram is similar to the diagram of system 120 in FIG. 6, except for power lines 127, 128 and 129 in lieu of power line 113. Current sensors 100 and voltage sensors 101 may be situated on lines 112, 127, 128 and 129. Outputs from sensors 100 and 101 may go filter bank 102. Connections from lines 127, 128 and 129 may go to a mechanism 125 that provides PLL input signals to MCU and/or DSP 104. Mechanism 125 may be in lieu of the zero crossing detector of system 120 in the diagram of FIG. 6. A cloud/web server 110 may be connected to system 120 via an internet connection 109.

Voltage sensing units 101 may provide a needed input range to a data acquisition system 103. Current sensor coils 100 (or current transformer) may be installed in each supply line, which step down the total current drawn (or total load) into a range suitable for measurement using the data acquisition system 103. The current and voltage sensor network 100 and 101 may be typically located at the main electric service panel at the home or building, and wiring may be provided for various appliances and equipment thereafter through circuit breakers (or MCBs). The approach may be adapted for using other power sensing devices such as energy meters, smart AMI meters, and so forth.

The DAC 103 may be designed to sample the analog voltage and current signals received from voltage and current sensor network at a desired frequency. The sampling frequency may be adjusted to optimize the processing capability of computing units downstream. In one approach, the DAC may acquire the V and I samples at a pre-decided frequency and the preprocessing unit 201 (FIG. 8) may process the raw data and modify the sampling rate as needed by the main processing unit 104. The approach may be adapted for other versions of data acquisition.

The preprocessing unit 201 may transform the digital voltage and current samples into a form for the algorithms which process the transformed data. In one approach, the preprocessing unit 201 may down sample the acquired current and voltage data and provide the data rate as demanded by the main processing (MCU and/or DSP) unit 104. In another approach, a power parameter calculation unit 203 may deduce the secondary energy parameters, active power, reactive power, apparent power, electrical energy (or KWh), line frequency, harmonic content, peak power, instantaneous power, and so forth. The approach may be adapted for utilizing other versions of pre-processing, deducing other parameters, and so on.

Figure 8:
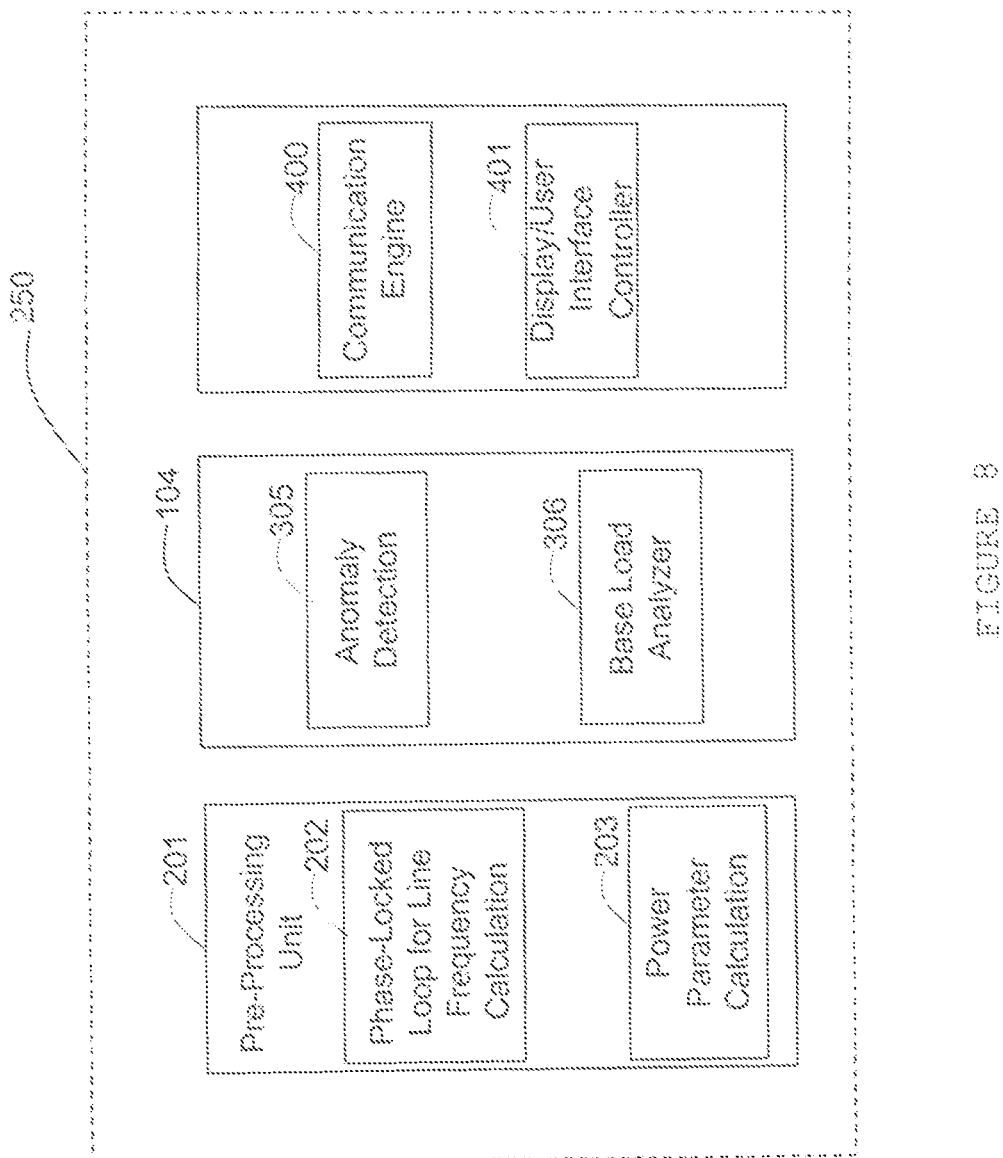
FIG. 8 is a diagram of a processor and functionalities for achieving base load analysis.

FIG. 8 is a diagram of a processor 250 and functionalities. In FIGS. 4 and 8, one may note whether there might be connection lines between the boxes or symbols, labels for all of the higher level symbols, and a more definitive correspondence of any of the symbols to the components in FIGS. 1-3 and 6-7. It may be seen that FIGS. 4 and 8 show algorithm modules running in the system, that is, FIG. 4 for load disaggregation and FIG. 8 for baseload analysis. Each Figure may have three themes (shown vertically): 1) Data acquisition and pre-processing; 2) Signature analysis and decision support; and 3) Advisory and user interface. Thus, no connection line is necessarily needed.

Specifically in FIG. 8, processor 250 may have a preprocessing unit 201 with a PLL engine 202 for line frequency calculation and a power parameter calculation mechanism 203. Another portion of processor 250 may incorporate an anomaly detection mechanism 305 and a base load analyzer 306. Also a part of processor may incorporate a communication engine 400 and a display/user interface controller 401.

In one approach, a main processor block 104 (FIG. 8) may host a suite of base load analysis algorithms. The analysis may be segregated into steps, namely, anomaly detection mechanism 305 and base load analyzer 306. The approach may be adapted for utilizing many other versions for performing the base load analysis task.

The anomaly detection module may analyze the total active and reactive power drawn by the load. This load may be compared with a reference value which may be adaptively obtained from a pre-prepared list/table as per standards. The reference value may be function of many attributes, such as location, time of day, ambient conditions, number of occupants, and so forth. This comparison may provide performance of the home with the values as stipulated in the standards. In another approach, the system may perform time-based base load analysis based on the acquired data and compare the results with historical data. In this way, the system may provide a chronological comparison of the base load.

In one approach, the instantaneous phase current and phase voltage may be analyzed to detect an appliance/equipment switching event. A detailed analysis of the load signature may be carried out in case of detection of a switching event. Many different detection techniques may be contemplated for this purpose. In one approach, a hypothesis testing technique in combination with maximum likelihood detection may be carried out. After detecting the event, the type of load may be inferred from the available list of loads present in the facility. This load may then be analyzed and further action to reduce the base load consumption might be suggested. Other parallel techniques may be contemplated.

In another approach, a set of parameters such as peak current, RMS current, rate of change of current, frequency change may be estimated and compared with the reference. Under an anomaly, the event may be analyzed and it may be decided whether the event is of interest or not. In one approach, the algorithm may compare the parameters of interest to stored parameters in the memory. The system may estimate the signature and understand whether a 24×7 appliance/equipment is switched ON or an occupant switched ON the system. In case of detection of event of interest, the base load analysis system may further process the data and investigate the anomaly. In one approach, the system may estimate a spectrum of the instantaneous current signal and analyze the frequency components. In one approach, the base load analysis may use short-time Fourier transform-based spectrum estimation and a non-parametric technique in the other one. In yet another approach, the signal processor may use an adaptive filtering algorithm to estimate the base load. In another approach, the signal processor may use a Kalman filter for the purpose. In yet another approach, the signal processor may use a wavelet-based time-frequency estimation technique. An overall idea in this analysis may be to obtain a state of the appliances/equipment and other loads, and then to perform the base load analysis. The detailed analysis may bring out the reasons for a higher base load and provide a way to control it. An active feedback on the energy performance and recommended actions may be provided to the user. Other techniques may be contemplated and adapted in the present approach.

In one approach, as noted herein, the main processor block may consist of a VSM engine and a DSS. The load disaggregation may be segregated into several steps, namely, load switching detection, virtual sub-metering analysis, and decision support. In one approach, the instantaneous phase current and phase voltage may be analyzed to detect an appliance/equipment switching event. A detailed analysis of the load signature may be carried out in case of detection of a switching event. Many different detection techniques may be available for this purpose. A hypothesis testing technique in combination with maximum likelihood detection may be carried out.

After detecting the switching event, the virtual sub-metering engine may carry out the time-frequency analysis of the load signature to assign the state of individual home appliance/equipment. A wavelet based signal transformation approach may be used, where the data in a time-domain is transformed to a time frequency domain. A continuous or a discrete wavelet transform may be attempted based on the processing capability of the main processor.

A series of transformation coefficients (also known as features) may be extracted from the transformed variables. A selected set of wavelet coefficients across the scales may be selected based on the thresholding techniques. A hard or a soft thresholding may be used for this purpose and various techniques for fixing the threshold under various levels may be explored. A signature analysis on the selected coefficients may be performed to reveal further details on the activities at home.

A decision support system may perform a second level of check on power parameters to minimize false alarms. A fuzzy decision support system may be employed. Other parallel decision support systems may be contemplated for this purpose.

Figure 9:
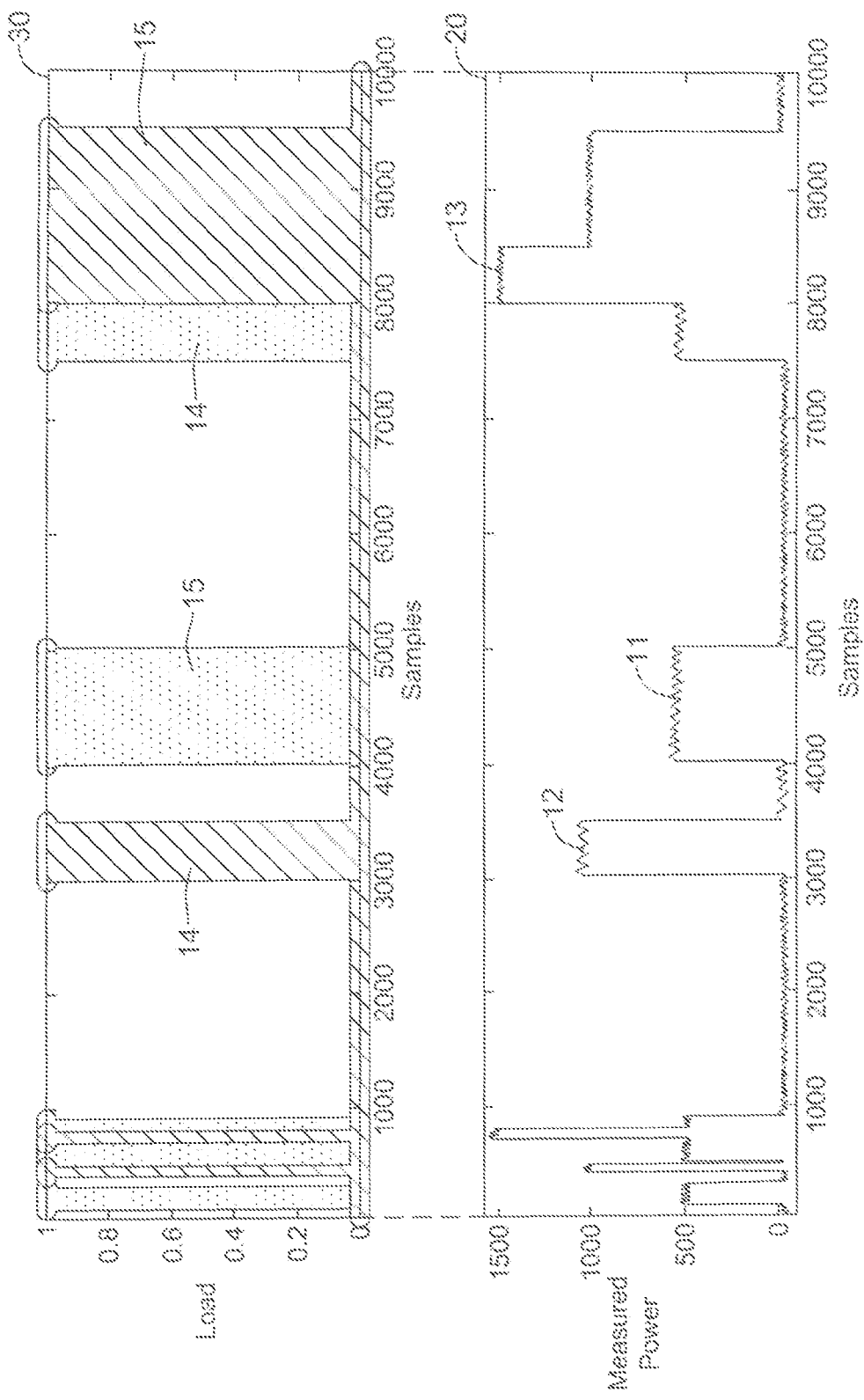
FIG. 9 shows a lower portion of a graph of rated loads of two appliances separately at two different levels, combined rated loads of the appliances at another level, and no loads of appliances at still another level, and an upper portion of a graph indicating whether there is a load or not, with shading, symbols or color to indicate a magnitude of the load if there is one.

The wavelet based virtual submetering may be considered. The high frequency energy data may be useful in virtual submetering issues. A wavelet based time-frequency analysis algorithm may be noted for this purpose. Any discontinuity (or spike) in energy data due to appliance/equipment switching may introduce characteristic frequencies. This spectrum may be characterized using wavelet coefficients and the type of switching (appliance type, ON/OFF, operation mode) may be deduced by analyzing the time-frequency spectrum of high frequency data from line-neutral (hot-neutral), neutral-ground currents/voltage (or active power). In this analysis, one may use RMS values for energy parameters. One may consider active power as the input and undertake wavelet analysis. To start with, the analysis may be performed using synthetic data with two loads. For example, a data summary may indicate a number of appliances as 2, the rated load of the appliances as 500 W and 1000 W, respectively, a sampling frequency as 10000 Hz, and a signal time length as 1 sec (for 10000 samples). One portion of FIG. 9 is a graph 20 of rated load of the one at levels 11 and 12, two at level 13, or no appliances versus samples. Another portion of FIG. 9 is a graph 30 shows whether there is a load and uses a color red at bars 14 if the load is about 1000 W or greater and a color blue at bars 15 if the load is about 500 W, with the load being indicated as 1 under those conditions. Other colors may be used in the graph. Shading or symbols may instead be used in this graph and other similar graphs mentioned herein.

Wavelet analysis may be noted. A 32-level decomposition of an original signal may be performed using multiple wavelet bases such as gauss, db, morlett, symlet and Naar wavelets. The ability of the system may be analyzed to detect appliance and equipment operation. Symlet and morlett may be identified as wavelet bases for virtual sub-metering applications.

Figure 10:
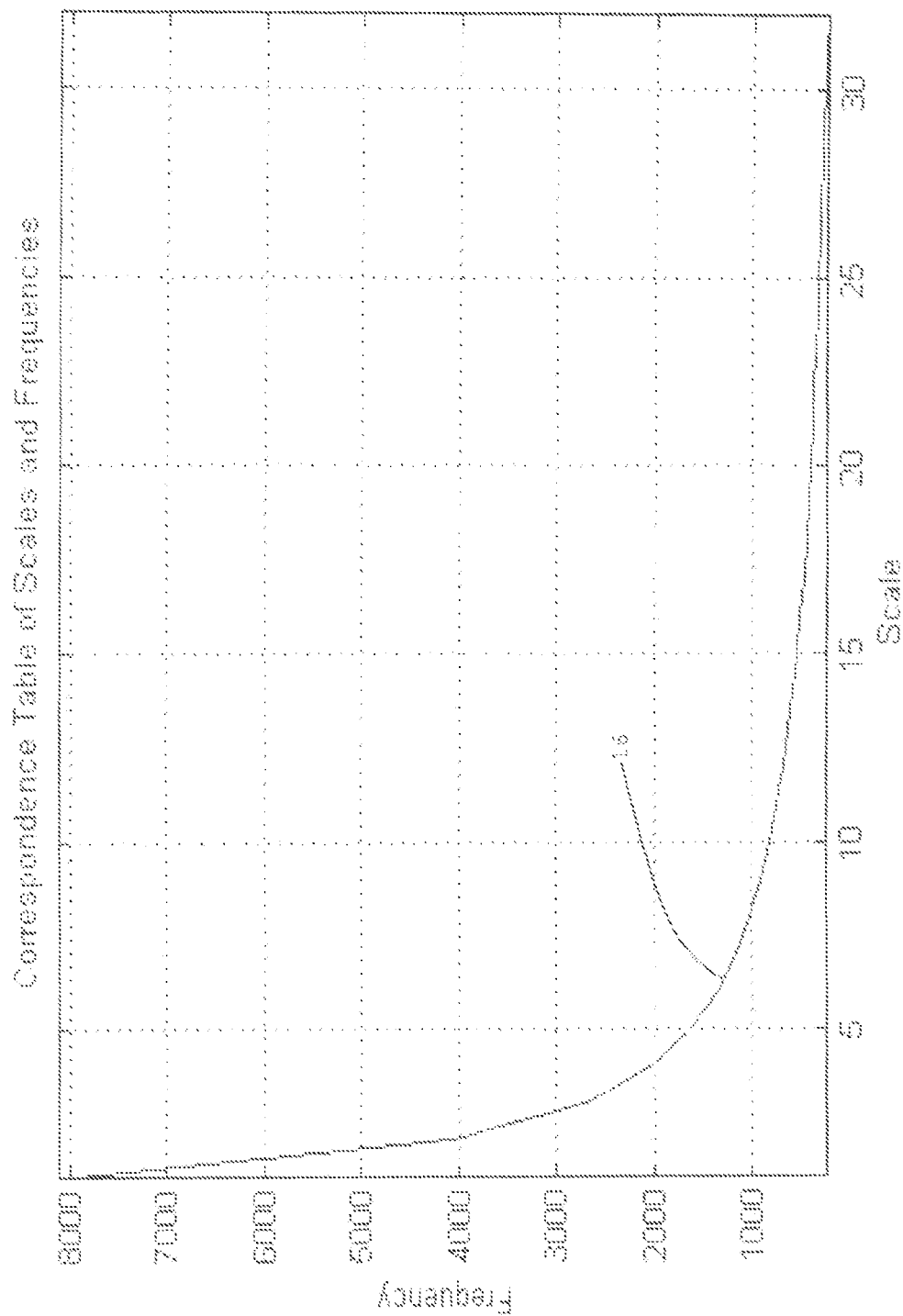
FIG. 10 is a graph of a correspondence between scales and frequencies relative to wavelet analysis.

A correspondence between scales and frequencies may be shown in a graph of FIG. 10. Frequency versus scale is plotted as a curve 16 in the graph. The graph may depend on the selected wavelet, a total number of scales and a sampling frequency. The Nyquist sampling criterion and the maximum frequency component in the signal may be assumed to be half of the sampling frequency.

If there is knowledge regarding the frequency component of the switching/operation of the appliances, then one may estimate the wavelet scales which contain those frequencies and accordingly classify the switching actions.

Figure 11:
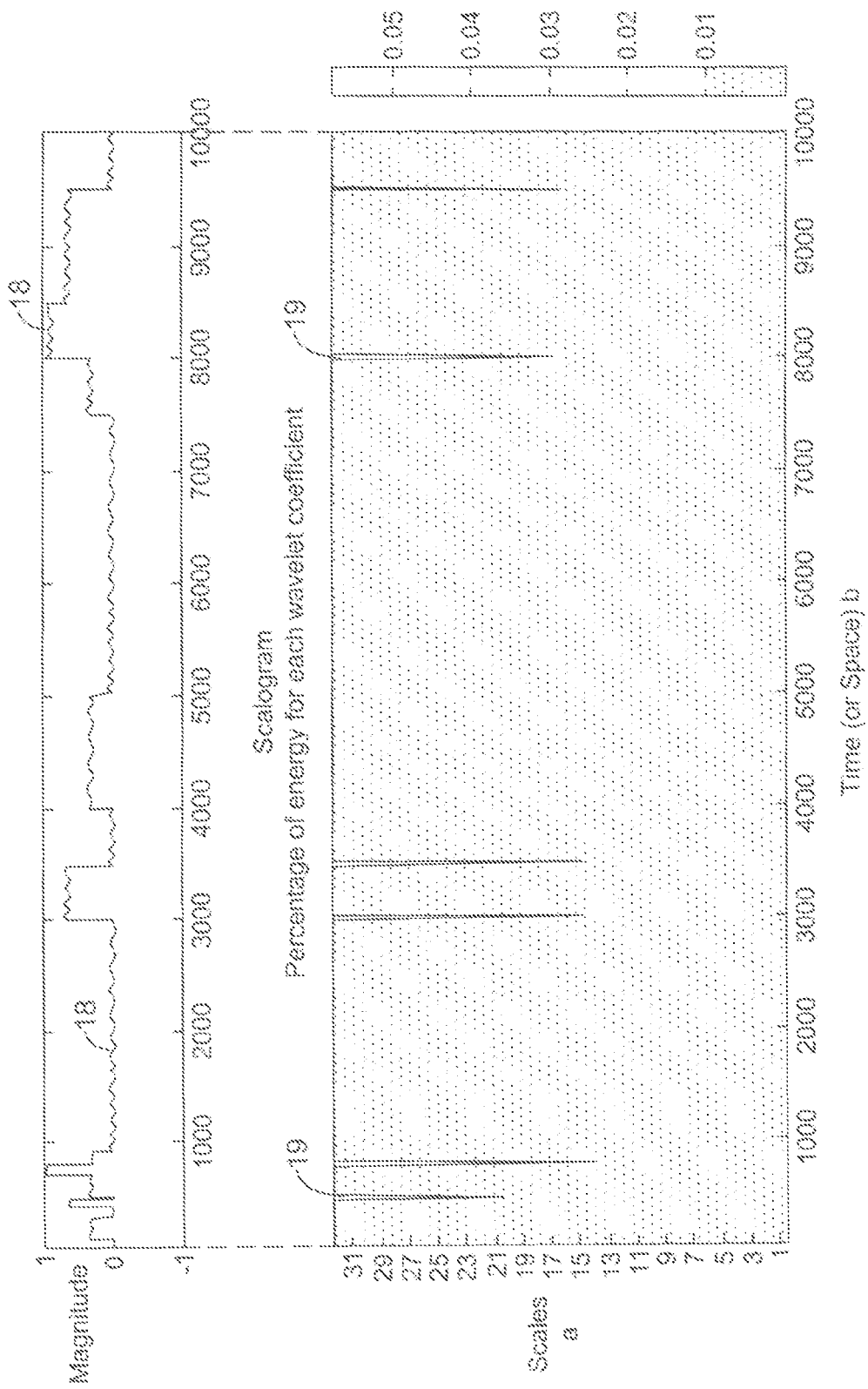
FIG. 11 is a diagram of a wavelet scalogram.

A wavelet scalogram may be noted in FIG. 11. A continuous wavelet analysis may be attempted to compute the scalogram of wavelet coefficients. One may experiment with many wavelet bases and infer suitability in virtual sub-metering applications. Symlet and morlet bases may be selected for virtual sub-metering applications.

The location of frequency information in the scalogram may depend on the wavelet used for the analysis. There may be a time and frequency uncertainty in time-frequency analysis applications. Some wavelets may be able to detect the frequency location very well; however, this may depend on what is known as the "support" that the basis function has under each scale.

Wavelet analysis of spa data may be noted. The signal 18 in a diagram of magnitude versus samples in FIG. 11 may be analyzed. Another diagram of scale versus time (or space) such as samples, may show a percentage of energy for each wavelet coefficient in the Figure. A home which was considered may have a spa with an electric heater. Large spikes 19 as seen in the diagram may be from the electric heater. A base load approximately of 1 KW may be observed at virtually all of the time. Intermittently, refrigerator and HVAC activity may also be seen. Wavelet analysis may be performed to understand distinct features which can be obtained for virtual sub-metering applications.

Figure 12:
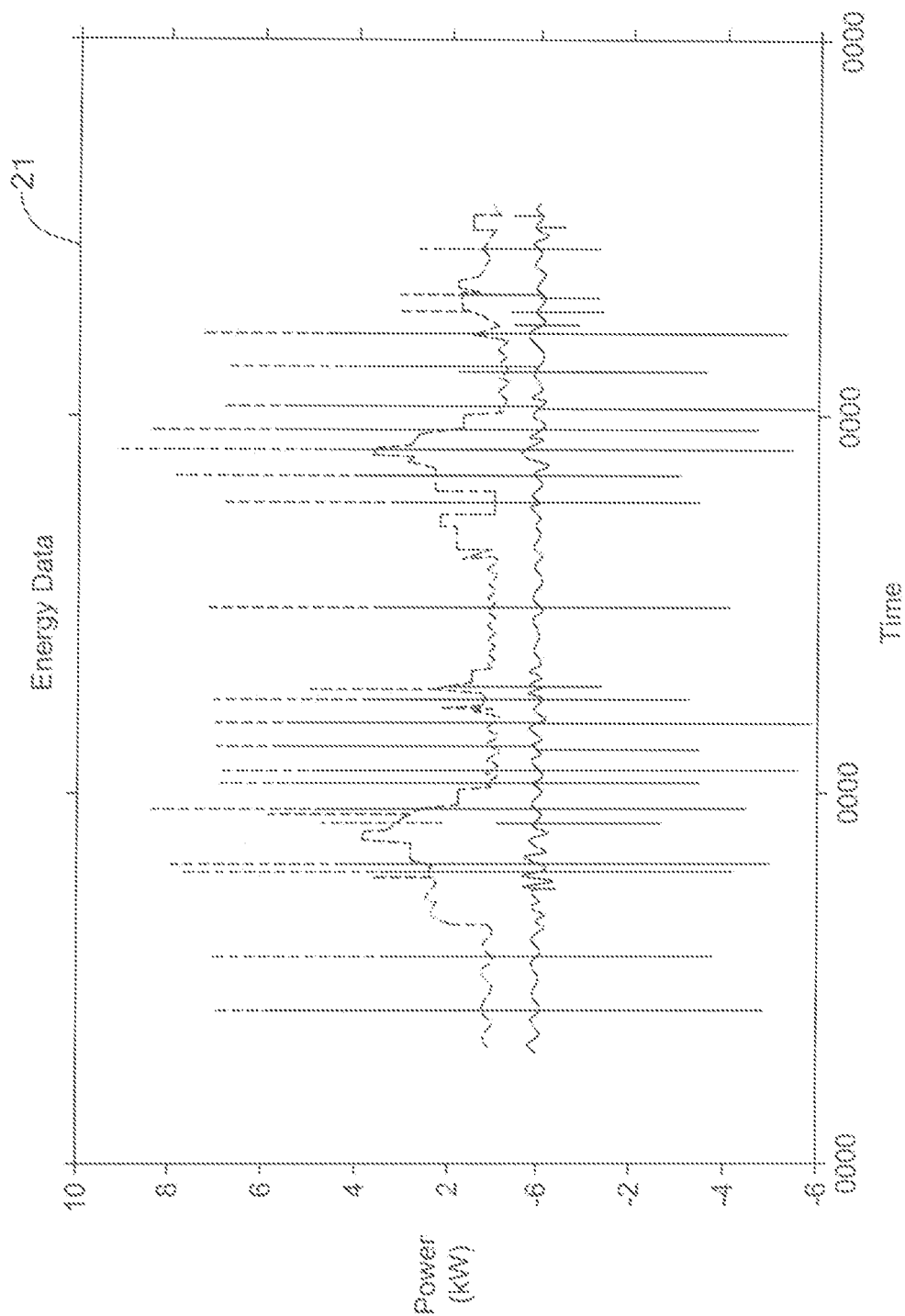
FIG. 12 is a graph of power (P) data and normalized power difference (dP/dt) energy data taken to demonstrate the usefulness of derivative power data in change detection.

In a graph 21 of FIG. 12, a wavelet transform of power (P) data and normalized "power difference (dP/dt)" energy data may be taken to demonstrate the efficiency of wavelet transforms in change detection and spectrum estimation. The data may be normalized between zero and one before a transforming the data into a wavelet domain.

Figure 13:
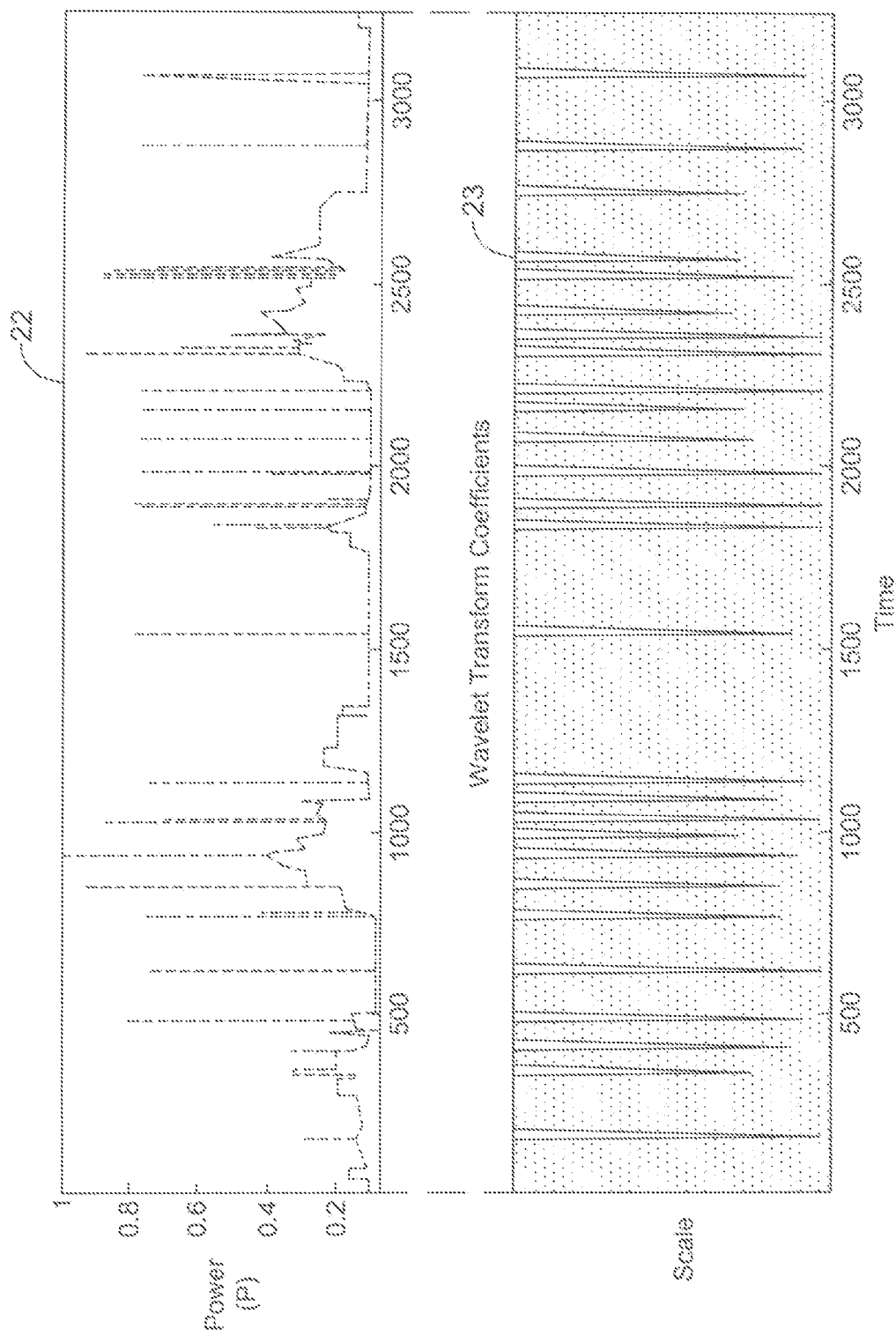
FIG. 13 is a diagram of power (P) versus time in a graph at an upper portion of the diagram and a corresponding graph at a lower portion of scale versus time showing wavelet transform coefficients.

FIG. 13 is a diagram of a power (P) versus time in a graph portion 22 with a corresponding graph portion 23 of scale versus time showing wavelet transform coefficients.

Figure 14:
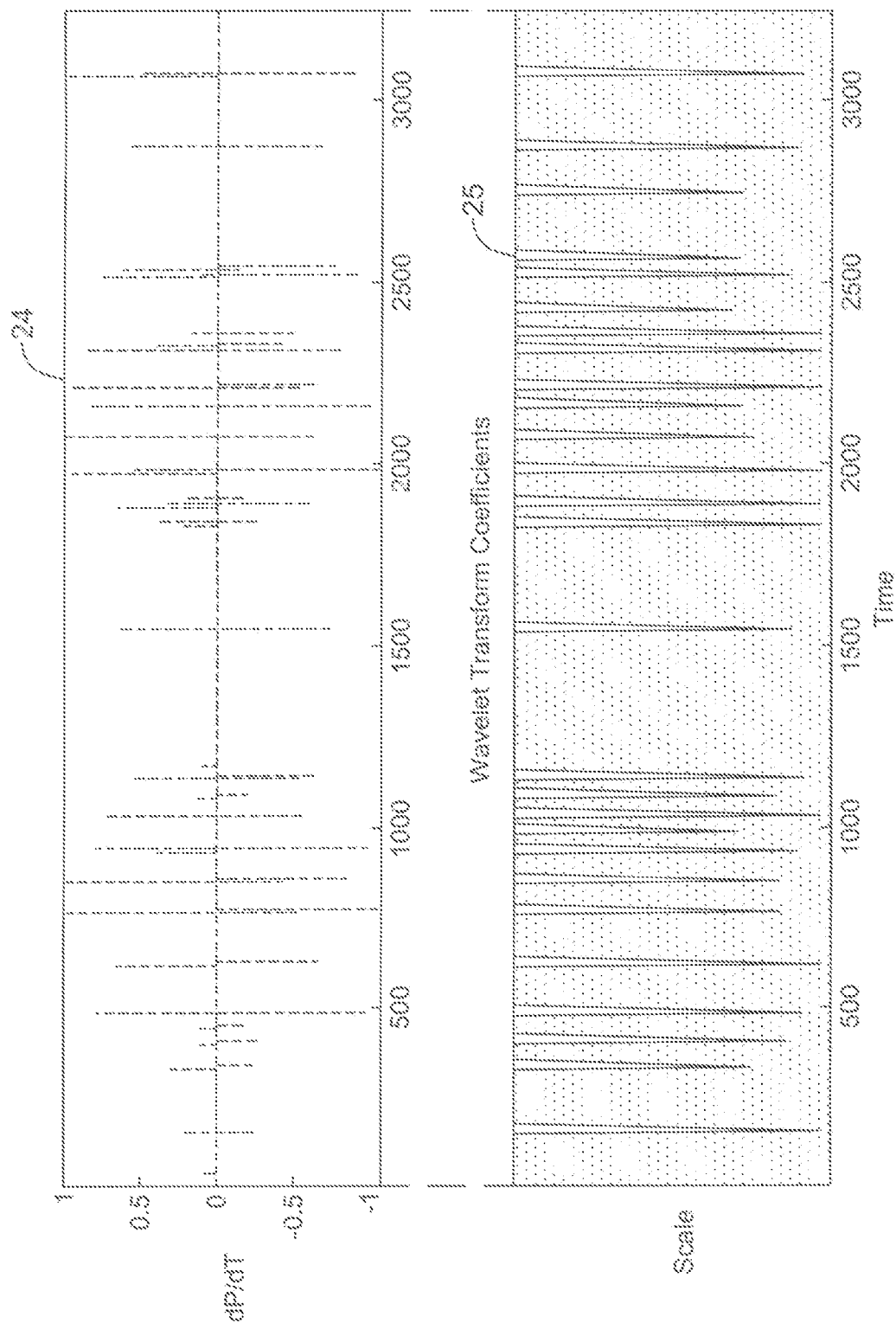
FIG. 14 is a diagram having an upper portion with a graph of dP/dT versus time with a corresponding graph of scale versus time showing wavelet coefficients at virtually all scales in an upper portion of the diagram.

As shown in graph portion 24 of dP/dT versus time in FIG. 14, a sharp discontinuity in power (and dP/dt) signal may give rise to high energy wavelet coefficients at virtually all scales, as shown in graph portion 25 of scale versus time. This may imply that a broad set of frequencies (from DC to sampling frequency (Fs)/2) are present in the data. This may be due to the fact that the power signal is sampled at one second intervals. Thus, virtually all transients (switch ON/switch Off and operation) may have died out and the data may contain steady state switching information. As the sampling rate is too small, switching operation may behave as a pulse with a sharp discontinuity. However, if there are high frequency data (e.g., 100 kHz), the corresponding frequency band, which is active during particular appliance switching, may be captured which could have a distinct signature (both in frequency and energy), that may be used for virtual sub-metering applications.

A U.S. patent application Ser. No. 13/192,096, filed on Jul. 27, 2011, entitled "System and Method for Detection of Home Occupancy", having the same assignee as that of the present application, is hereby incorporated by reference.

A U.S. patent application Ser. No. 13/192,141, filed on Jul. 27, 2011, entitled "System and Method for Evaluation of Programmable Thermostat Usage Efficiency and Control of HVAC System", having the same assignee as that of the present application, is hereby incorporated by reference.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A disaggregation system comprising:
a power sensor unit connected to a power supply system;
one or more components connected that consume power connected to the power supply system;
a data acquisition mechanism connected to the power sensor unit;
a microcontroller unit connected to the data acquisition mechanism; and
wherein:
the data acquisition mechanism provides energy information to the microcontroller unit;
the microcontroller unit determines a difference between the total power drawn by all of the one or more components and a predetermined reference value;
the microcontroller unit determines, at least in part based on the difference between the total power drawn by all of the one or more components and the predetermined reference value, a switching event; and
the microcontroller unit provides disaggregated energy information, wherein the predetermined reference value is a function of one or more of: location, time of day; ambient conditions; and number of occupants of the facility.

2. The system of claim 1, wherein:
the power supply system comprises one or more power lines, and
the power sensor unit comprises:
a voltage sensor connected to a filter unit; and
a current sensor connected to the filter unit;
the voltage and current sensors are connected to the one or more power lines which provide power to a facility having the one or more components; and
the voltage and current sensors provide voltage and current signals representing voltage and current on the one or more power lines.

3. The system of claim 2, wherein:
the energy information to the microcontroller indicates a gross amount of energy consumed by the facility;
voltage and current signals from the one or more power lines to the power sensor indicate the gross amount of energy consumed by the facility; and
disaggregated energy information indicates individual amounts of energy consumed by the one or more components, respectively, of the facility.

4. The system of claim 3, wherein the individual amounts of energy consumed by the one or more components may be adjusted for purposes of conserving energy.

5. The system of claim 3, wherein:
the voltage and current signals indicate the energy information which goes from the power sensor to the data acquisition mechanism;
the signals are processed by the data acquisition mechanism and go to the microcontroller unit; and
signals from the data acquisition mechanism are processed by the microcontroller unit with a time-frequency analysis.

6. The system of claim 5, wherein the state of a HVAC, pool pump, pool heater, smart appliances, and/or other components are considered reduced from whole facility energy to enhance load disaggregation.

7. The system of claim 5, wherein:
the time-frequency analysis comprises a wavelet transform down select of select coefficients and feature analysis; and
the down select of select coefficients and feature analysis provide the disaggregated energy information.

8. The system of claim 7, further comprising:
a zero crossing detector connected to the microcontroller unit; and
wherein the microcontroller unit comprises a digital signal processor.

9. The system of claim 8, further comprising:
one or more items from a group consisting of an internet having a connection to the microcontroller unit, a server having a connection to the internet, a hand-held personal digital assistant having a connection to the microcontroller unit, feedback from a thermostat for the facility having a connection to the microcontroller unit, feedback from one or more components of the facility having a connection to the microcontroller unit, a remote display having a connection to the microcontroller unit, and an outside air sensor having a connection to the microcontroller unit; and wherein a connection is wireless or wired.

10. The system of claim 2, wherein:

samples of current and voltage from the current and voltage sensors are analyzed for detection of a switching event;

the switching event is provided a classification if detected;

a decision support system in conjunction with the classification is implemented for down selecting individual loads; and the individual loads are for determining disaggregated information.

11. A method for determining energy consumption by each of two or more electrical loads connected to a power line by load disaggregation, comprising:

obtaining signals from a power line connected to the two or more electrical loads;

processing the signals into information for event detection;

detecting an event; and performing analysis of the event to obtain a disaggregation of a total energy consumption to determine energy consumption by each of the two or more loads connected to the power line;

wherein performing analysis of the event to obtain a disaggregation of a total energy consumption to determine energy consumption by each of the two or more loads connected to the power line comprises:

performing a load analysis of the event to determine at least one possible load;

performing a signature analysis of the signals to identify a type of load; and determining if the type of load is inductive, SMPS or resistive; and wherein:

if the load is inductive, then combine prior inductive load information with results of the load and/or signature analysis, and disaggregate the load;

if the load is SMPS, then combine prior SMPS load information with results of the load and/or signature analysis, and disaggregate the load;

if the load is resistive, then combine prior inductive load information with results of the load and/or signature analysis, and disaggregate the load; or if the load is not inductive, SMPS or resistive, then perform an overall likely load analysis.

12. The method of claim 11, wherein processing the signals into information for event detection, comprises:

performing extraction of one or more features from the signals; and detecting an event from the one or more features.

13. The method of claim 11, wherein processing the signals into information for event detection, comprises:

decomposing the signals using a wavelet transform;

retaining appropriate wavelet coefficients at scales needed for a load disaggregation application;

detecting discontinuities in each of the scales;

detecting a switching of a load; and detecting an event.

* * * * *